United States Patent [19]

Inoguchi

[11] Patent Number: 5,229,870

[45] Date of Patent: Jul. 20, 1993

[54] LIGHT EMITTING DEVICE CAPABLE OF READILY CONTROLLING TOTAL QUANTITY OF LIGHT UNDER A BALANCED LIGHT EMITTING STATE OF LIGHT EMITTING ELEMENTS

[75] Inventor: Tsukasa Inoguchi, Nara, Japan

[73] Assignee: Sharp Kabushiki Kaisha, Osaka, Japan

[21] Appl. No.: 654,689

[22] Filed: Feb. 13, 1991

[30] Foreign Application Priority Data

Feb. 15, 1990 [JP] Japan .................................. 2-14012

[51] Int. Cl.⁵ .............................................. H04N 1/04
[52] U.S. Cl. ..................................... 358/475; 358/474
[58] Field of Search ............... 358/474, 475, 476, 494, 358/482

[56] References Cited

U.S. PATENT DOCUMENTS 4,706,128 11/1987 Tanioka et al. ..................... 358/476
4,789,903 12/1988 Kamada et al. ..................... 358/476
4,954,914 9/1990 Karita et al. ......................... 358/475

FOREIGN PATENT DOCUMENTS

| 243089 | 10/1987 | European Pat. Off. . |
| 2555584 | 6/1977 | Fed. Rep. of Germany . |
| 2925692 | 1/1980 | Fed. Rep. of Germany . |
| 3418366 | 11/1984 | Fed. Rep. of Germany . |
| 3622025 | 10/1987 | Fed. Rep. of Germany . |
| 2333199 | 6/1977 | France . |
| 2426381 | 12/1979 | France . |
| 2-10554 | 3/1990 | Japan . |
| 8808235 | 10/1988 | PCT Int'l Appl. . |
| 8900299 | 1/1989 | PCT Int'l Appl. . |
| 1543722 | 4/1979 | United Kingdom . |

OTHER PUBLICATIONS

"Nikkei Electronics" (No. 470, Apr. 3, 1989) p. 159.

Primary Examiner—Edward L. Coles, Sr.
Assistant Examiner—Kim Yen Vu
Attorney, Agent, or Firm—Birch, Stewart, Kolasch & Birch

[57] ABSTRACT

Improved driving circuitry for a light source used in a dot matrix display board, a copying machine or a facsimile machine is disclosed. The light source includes a plurality of light emitting diodes (D11 to D44) each connected in parallel, and the quantity of light from each of the light emitting diodes can be balanced by providing proper resistors (R1 to R4). Additionally, the control of the total quantity of light from the light emitting diodes can be readily performed, since the total driving current is changed by changing the value of a variable resistor (Rv1).

2 Claims, 4 Drawing Sheets

LIGHT EMITTING DEVICE CAPABLE OF READILY CONTROLLING TOTAL QUANTITY OF LIGHT UNDER A BALANCED LIGHT EMITTING STATE OF LIGHT EMITTING ELEMENTS

BACKGROUND OF THE INVENTION

1. Field of the Invention

The present invention relates generally to light emitting devices, and in particular, to a light emitting device which can readily control the total quantity of light, under a balanced light emitting state of a plurality of light emitting elements. The present invention has particular applicability to a display device or an image reading device utilizing a plurality of light emitting diodes.

2. Description of the Background Art

Among many kinds of light emitting elements which are conventionally known, particularly a light emitting diode (LED) has been utilized in various electric appliances, with the recent development of the technique of manufacturing semiconductor devices. The present invention can be generally applied to a light emitting device having a plurality of light emitting elements, and as an example, the present invention is applied to a device which needs a plurality of light emitting diodes in the following description.

A light emitting diode is used, in one application, as a light source in discharging for a copying machine, a laser beam printer or the like. FIG. 1 is a view schematically showing a conventional copying machine. The copying machine shown in FIG. 1 is seen, for example, in Japanese Utility Model Publication, No. 2-10544. Referring to FIG. 1, light generated from a light source 22 illuminates an original 21, and the light reflected from the original 21 is applied through mirrors and a lens to a photosensitive drum 23. Toner responds to the applied photo signal and is deposited onto the surface of the photosensitive drum 23 with the aid of a magnetic brush 4. The toner deposited on the drum 23 is transferred onto a sheet of transfer paper 27, and a picture depicted on the original 21 is therefore defected onto the transfer paper 27. After the transfer, the photosensitive drum 23 receives light generated from a light source for discharging 28, and is thereby made free from a charge state caused by the reflected light. The toner deposited on the photosensitive drum 23 is removed by a rotary brush 29. It is pointed out that in the copying machine shown in FIG. 1, a light emitting diode is often utilized as the light source for discharging 28.

FIG. 2 is a view schematically showing an original reader in a conventional facsimile machine. The original reader shown in FIG. 2 is seen in "Nikkei Electronics" (No. 470, Apr. 3, 1989), p.159. Referring to FIG. 2, an original 30 is inserted into the reading device through the drum 31 or 32. Light is illuminated onto the original 30 from a light source 33 for reading, and the reflected light is applied to a CCD 38 through mirrors 34 to 36 and a lens 37. A video signal based on a picture depicted on the original 38 is therefore produced in the CCD 38. The video signal is transmitted to other facsimile machines through a transmitting apparatus (not shown). It is pointed out that in a facsimile machine as shown in FIG. 2, a light emitting diode is frequently used as the light source 33 for reading.

Additionally, a dot matrix display board, in which a plurality of light emitting diodes are utilized, is known. In the dot matrix display board, a plurality of light emitting diodes are arranged in a matrix, and information represented by characters or symbols is displayed by emission of light from selected light emitting diodes.

In the above electrical apparatus, a plurality of light emitting diodes are employed to form a necessary light source, and the following problems arise unless the quantity of light generated from each of the light emitting diodes is constant. If, for example, the light quantity of each of a plurality of light emitting diodes used as a light source for discharge in a copying machine is not constant, the discharge from the photosensitive drum 23 shown in FIG. 1 cannot be performed in a uniform manner. In addition, unless the light quantity of each of the light emitting diodes used in the light source 33 of the original reader shown in FIG. 2 is constant, an accurate video signal cannot be obtained in the CCD 38. Thus, the original cannot be read accurately in a copying machine or a facsimile machine. Additionally, if the light quantity of each of the light emitting diodes arranged in a dot matrix display board is not even, a display displayed on the dot matrix display board is difficult to read and an error can be caused in reading in an extreme case. It is pointed out that a driving current for each of the diodes should be controlled so that light generated from each of the diodes is even.

FIG. 3 is a circuit diagram showing a conventional driving circuit of a light source employing light emitting diodes. Referring to FIG. 3, the driving circuit includes light emitting diodes D1 to Dn each connected in parallel, resistors R1 to Rn connected to the diodes D1 to Dn, respectively, and a constant voltage source E. The resistors R1 to Rn are used to avoid the above described problems by controlling a driving current for each of the diodes D1 to Dn. Since the driving current/quantity of light characteristic of each of the light emitting diodes D1 to Dn is not constant, the quantity of light is made uniform by setting the values of the resistors R1 to Rn properly. The resistors R1 to Rn can be replaced with resistors Rx1 to Rxk which are prepared in a factory and have various resistance values. A resistor having a proper value for each of the resistors R1 to Rn is connected whereby the quantity of light from each of the diodes D1 to Dn is made uniform. There exists a necessity for preparing many kinds of resistors having various resistance values in the factory.

Additionally, even once proper resistors R1 to Rn are connected, and the quantity of light from each of the light emitting diodes D1 to Dn is made uniform, the total quantity of light frequently should be controlled. In other words, not only balancing the quantity of light from the individual light emitting diodes D1 to Dn, but also the quantity of light from all the other diodes D1 to Dn should be controlled in some cases. In such a case, conventionally, all the resistors R1 to Rn are replaced with others and time required for the replacement is increase due to the increase of the number of the light emitting diodes D1 to Dn to be used. Furthermore, besides the above described replacement in the factory, the control for the total quantity of light is often necessary in the maintenance of the electrical instruments. Like other electrical components, the quantity of light from a light emitting diode tends to decrease according to an increase in use. In such a case, the resistors R1 to Rn have to be replaced in maintenance, in order to insure a constant total quantity of light. The time required for the maintenance is increased accordingly.

SUMMARY OF THE INVENTION

One object of the present invention is to simplify the control of the total quantity of light, in a light emitting device having a plurality of light emitting elements.

Another object of the present invention is to reduce the number of components required for controlling the total quantity of light, in a light emitting device having a plurality of light emitting elements.

A further object of the present invention is to simplify operations required for making the brightness of a display uniform, in an information display device.

Another object of the present invention is to accurately read a picture depicted on a applied original, in an image reading apparatus.

Briefly stated, a light emitting device in accordance with the present invention includes a plurality of light emitting elements at least in one direction. Each of the light emitting elements is connected in parallel between first and second power supply potentials. The light emitting device further includes a plurality of individual driving current controllers connected in series to the light emitting elements, respectively, and a total driving current controller for controlling the total driving current which flows through a plurality of light emitting elements.

In operation, the total driving current can be controlled without adjusting individual driving current controllers, since the total driving current controller controls the total driving current which flows through the plurality of light emitting elements. The control of the total quantity of light generated from the plurality of light emitting elements therefore can be easily performed.

An image reading apparatus in accordance with the present invention includes, in one aspect, a light emitting circuit for emitting light to illuminate an applied original, and a picture detector to detect a picture depicted on the original in response to an optical signal reflected from the original. The light emitting circuit includes a plurality of light emitting elements arranged at least in one direction. Each of the light emitting elements is connected in parallel between first and second power supply potentials. The light emitting circuit further includes a plurality of individual driving current controllers connected in series to the light emitting elements, respectively, and a total driving current controller for controlling the total driving current which flows through the plurality of light emitting elements.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 4:
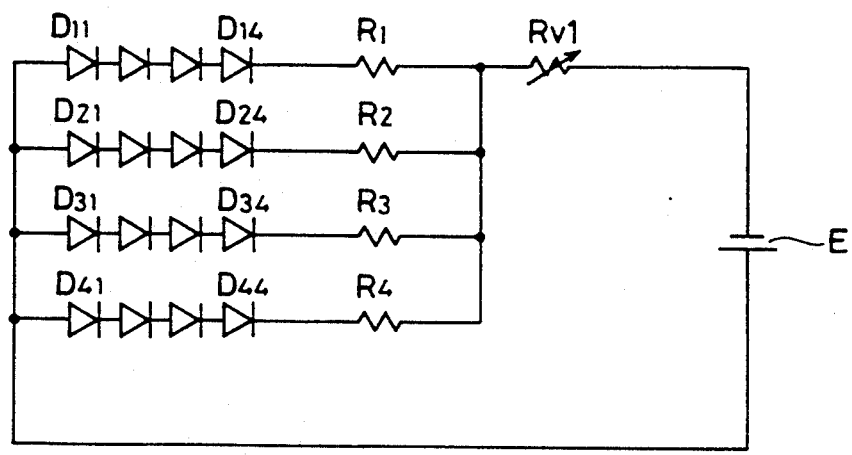
FIG. 4 is a circuit diagram of a light source driving circuit showing one embodiment of the present invention.

Referring to FIG. 4, the light source driving circuit includes trains of light emitting diodes connected in series with each other including D11 to D14, D21 to D24, D31 to D34 and D41 to D44; resistors R1 to R4 each connected in series to the trains of light emitting diodes, respectively; a variable resistor Rvl connected in series to the parallel connection of the trains of light emitting diodes; and a constant voltage supply E. The light emitting diodes D11 to D44 are arranged in an array and Form, for example, a dot matrix display board. Each of the resistors R1 to R4 controls a driving current which passes each train of light emitting diodes. The quantity of light emitted from each train of light emitting diodes can be made uniform by setting the resistance value of each of the resistors R1 to R4 properly, i.e. by connecting resistors each having a proper resistance value to the resistors R1 to R4, respectively. The quantity of light emitted from each train of the light emitting diodes are balanced and then the total quantity of light can be easily controlled by changing the resistance value of the variable resistor Rvl. Although the variable resistor Rvl is required for balancing the quantity of light from the trains of light emitting didoes, the adjustment for controlling the total quantity of light is remarkably simplified. Consequently, by controlling the resistance value of the variable resistor Rvl, the brightness of the dot matrix display board can be changed in accordance with the ambient illuminance.

Figure 5:
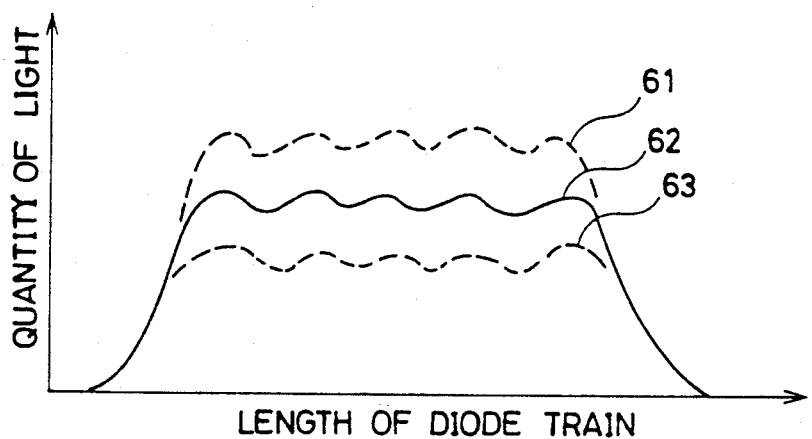
FIG. 5 is a characteristic view showing the relation between a total driving current and the quantity of light in the light source driving circuit shown in FIG. 4.

A characteristic view showing the relation between the total driving current and the quantity of light in the light source driving circuit shown in FIG. 4 is shown in FIG. 5. In FIG. 5, the abscissa represents the length of a train of light emitting diodes, and the ordinate represents the quantity of light. By increasing the resistance value of the variable resistor Rvl, the total driving current is reduced thereby changing the quantity of light from line 61 toward line 63. It is pointed out that besides the dot matrix display board, the light source driving circuit shown in FIG. 4 can be applied as a driving circuit for the above described light source for discharging in a copying machine or a light source for reading in a facsimile machine besides the dot matrix display board.

Figure 6:
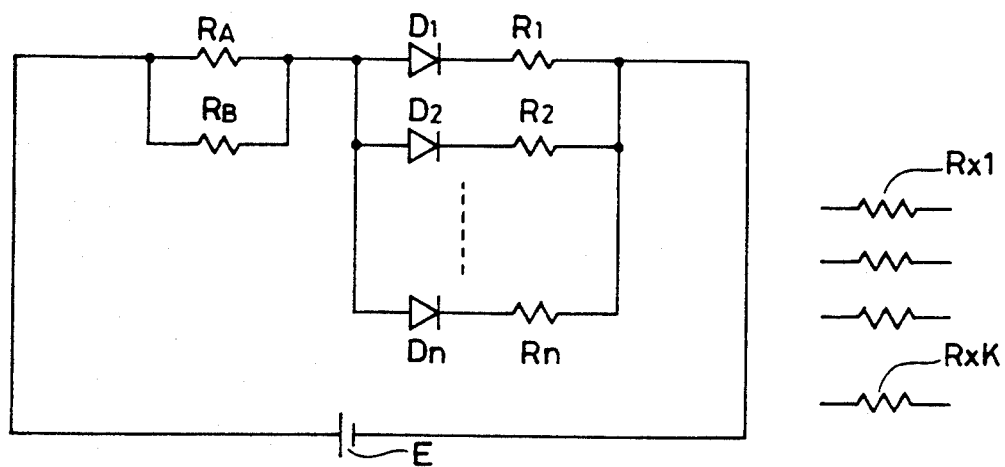
FIGS. 6 through 9 are circuit diagrams of a light source driving circuit each showing an example of the present invention.

Referring to FIG. 6, a light source driving circuit showing another embodiment in accordance with the present invention includes light emitting diodes D1 to Dn connected in parallel to each other, resistors R1 to Rn each connected in series to the respective diodes D1 to Dn, a parallel connection of resistors $R_A$ and $R_B$ connected in series to the parallel connection of light emitting diodes D1 to Dn, and a constant voltage supply E. Each of the resistors R1 to Rn are used for balancing the quantity of light of the respective light emitting diodes D1 to Dn. The total driving current of the light emitting diodes D1 to Dn can be controlled by selecting as resistors $R_A$ and $R_B$ a combination of two sets of various resistors Rx1 to Rxk, which are prepared in a factory. In other words, without using a variable resistor Rvl, a total driving current can be controlled in a wide range, since the total driving current can be controlled to various levels according to the combination of resistors $R_A$ and $R_B$. In the above case, various resistance values for controlling the total driving current can be obtained by connecting further resistors in parallel in addition to the resistors $R_A$ and $R_B$ thus reducing the variety of resistors or the number of components to be prepared in the factory.

Figure 7:
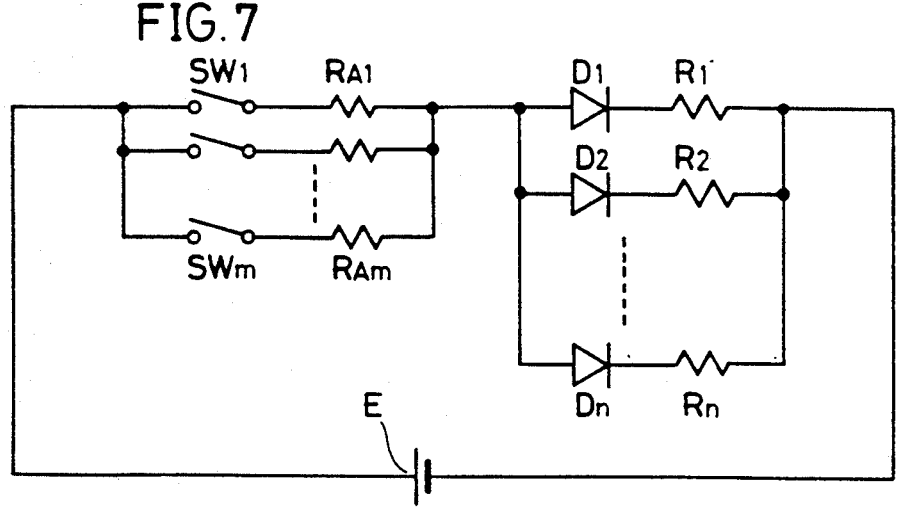

Referring to FIG. 7, a light source driving circuit representing a further embodiment of the present invention includes resistors $R_{A1}$ to $R_{Am}$ which can be selected for controlling a total driving current, and switches SW1 to SWm connected in series to the resistors $R_{A1}$ to $R_{Am}$, respectively. By turning on one of the switches Sw1 to SWn selectively, one of the resistors for controlling the total driving current is determined.

Figure 8:
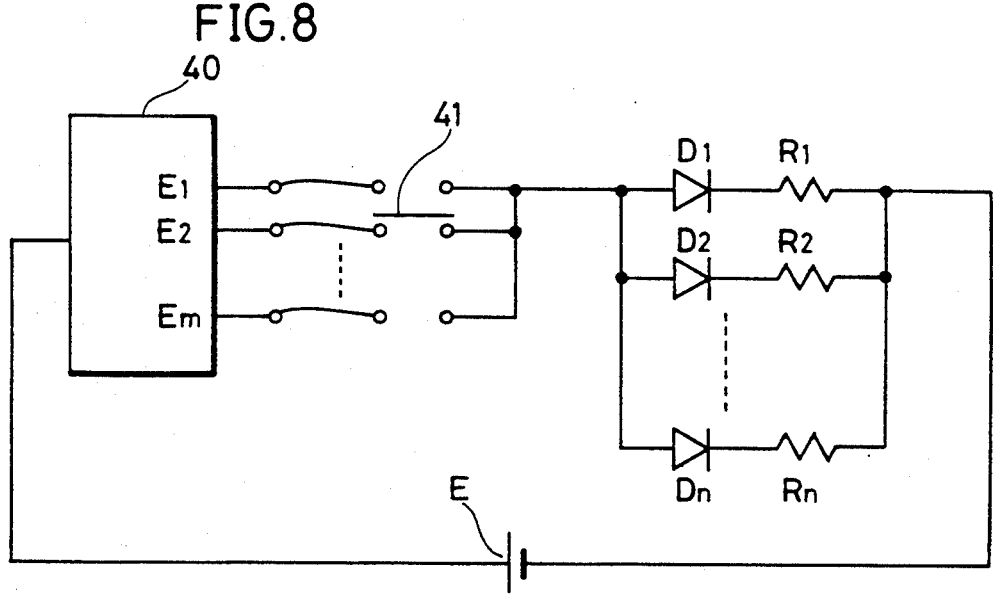

Referring to FIG. 8, a light source driving circuit showing another embodiment of the present invention includes a power supply voltage generation circuit 40 for receiving power supply voltage from the constant voltage supply E and for generating power supply voltages E1 to Em having different voltage levels, and a selecting element 41 for selecting one of the power supply voltages E1 to Em. The power supply voltage which determines the total driving current flowing through the parallel connection of light emitting diodes D1 to Dn is selected by the selecting element 41, and therefore, the total quantity of light from the light emitting diodes D1 to Dn can be controlled.

Figure 9:
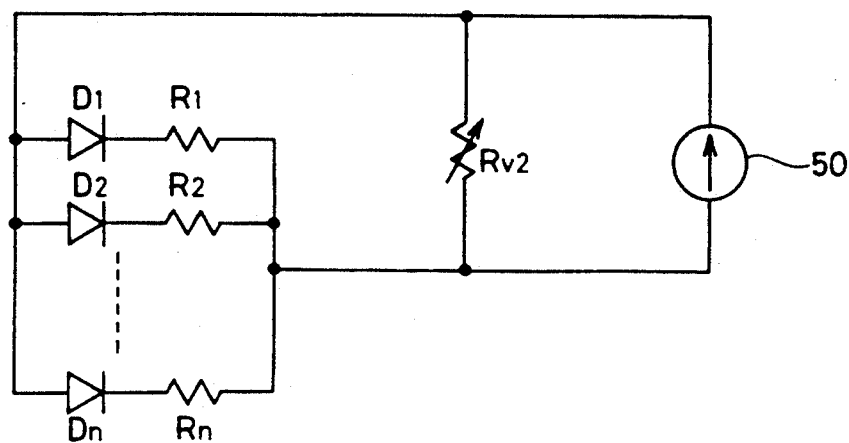

Referring to FIG. 9, a light source driving circuit showing another embodiment of the present invention employs a current source 50 in place of the constant voltage supply E. The parallel connection of light emitting diodes D1 to Dn and a variable resistor Rv2 are connected in parallel. A constant current is supplied from the constant current source 50, the total driving current which flows through the light emitting diodes D1 to Dn can be controlled by changing the value of the variable resistor Rv2. The total quantity of light generated from the light emitting diodes D1 to Dn is thus controlled by controlling the variable resistor Rv2.

Figure 1:
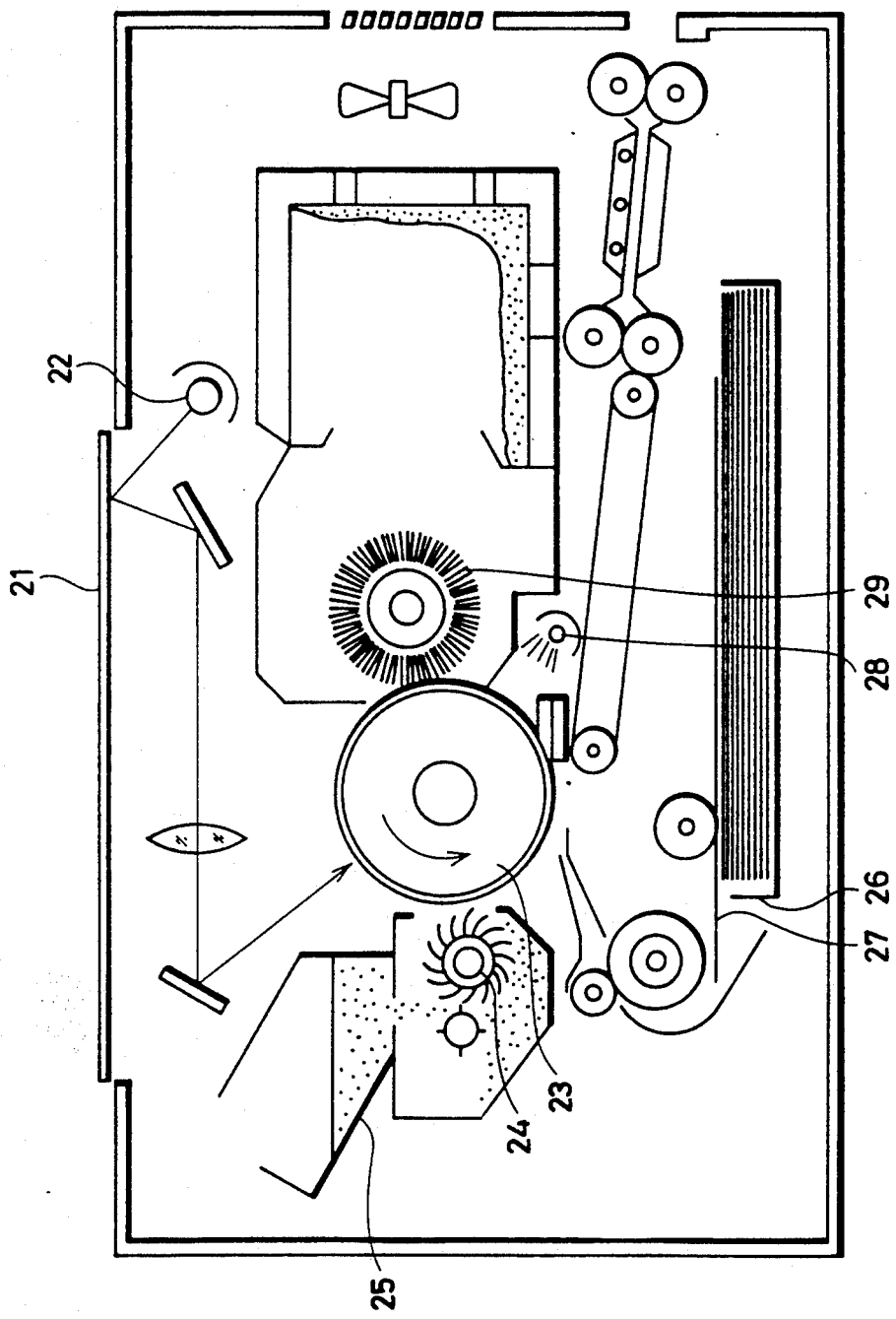
FIG. 1 a schematic diagram of a conventional copying machine.
Figure 2:
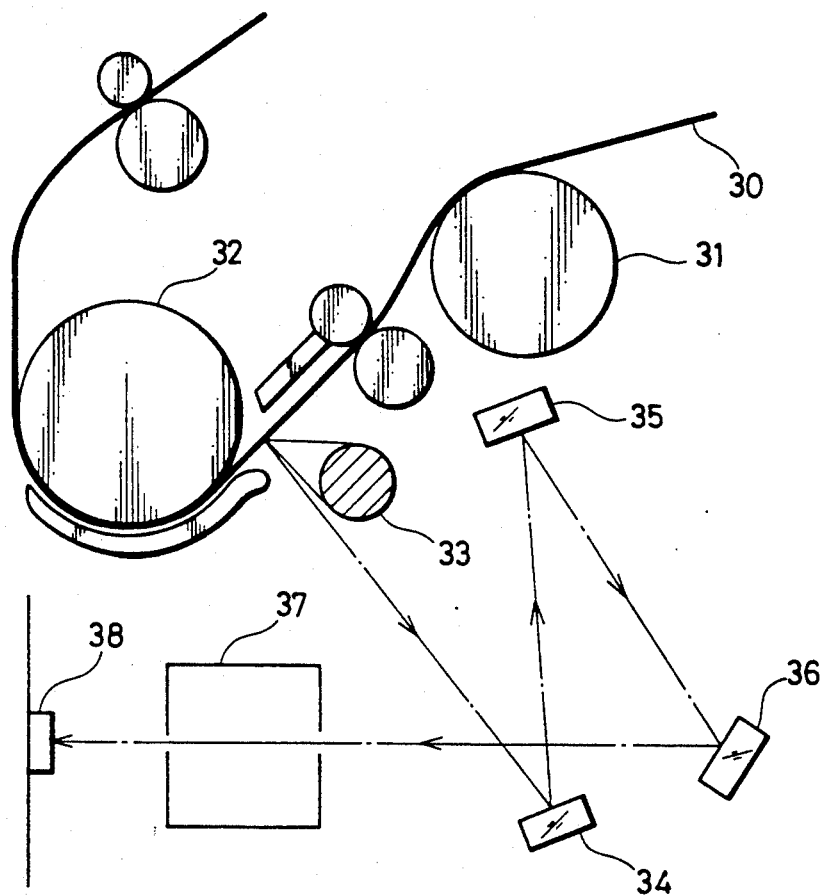
FIG. 2 is a schematic diagram of an original reader in a conventional facsimile machine.
Figure 3:
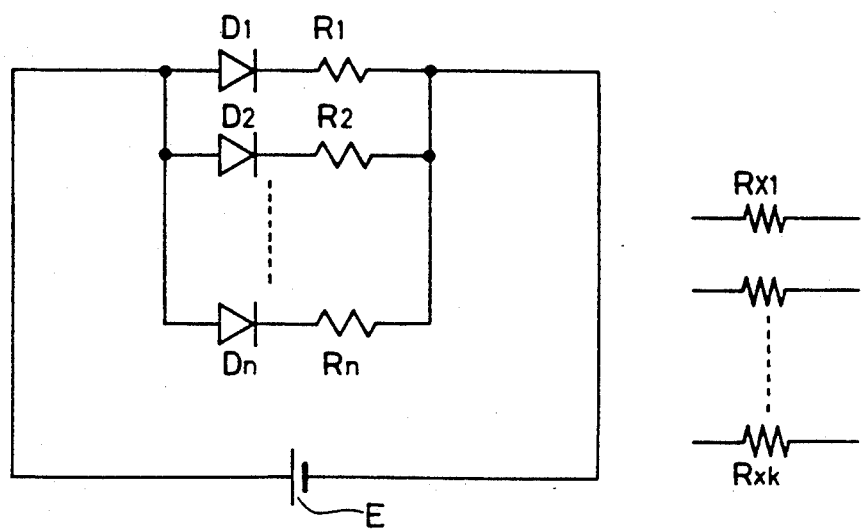
FIG. 3 is a circuit diagram of a conventional driving circuit having a light source employing light emitting diodes.

As described above, the total quantity of light can be easily controlled by performing improvements as shown in FIGS. 4, 6, 7, 8 and 9 in order to control the total driving current which flows through a plurality of light emitting diodes. Additionally, the number of components i.e., the number of resistors to be prepared in a factory is reduced since the variety of resistors required for controlling the total quantity of light is reduced. The application of the above mentioned light driving circuit as the light source for discharging 28 in the copying machine shown in FIG. 1 or as the driving circuit of the light source 33 for reading in the facsimile machine shown in FIG. 2 provides an image apparatus capable of accurately reading a picture depicted on an applied original. Furthermore, an information display device can be obtained, which can control the brightness of the display easily in accordance with the illumination of the surrounding environment.

Although the present invention has been described and illustrated in detail, it is clearly understood that the same is by way of illustration and example only and is not to be taken by way of limitation, the spirit and scope of the present invention being limited only by terms of the appended claims.

What is claimed is:

1. A light emitting device comprising:
a first plurality of light emitting elements arranged at least in one direction, each of said light emitting elements being connected in parallel between first and second power supply potentials;
a corresponding first plurality of individual driving current control means each connected in series to a corresponding one of said light emitting elements for controlling individually a driving current flowing through each of said light emitting elements, respectively; and
total driving current control means coupled to said first plurality of light emitting elements for controlling the total driving current flowing through said first plurality of light emitting elements including,
controllable power supply voltage generation means connected to said first power supply potential for supplying a predetermined plurality of controllable power supply voltages to the parallel connection of said first plurality of light emitting elements, and
selecting means connected to said controllable power supply voltage generation means for supplying one of the predetermined plurality of voltages selectively to the parallel connection of said first plurality of light emitting elements.

2. A light emitting device comprising:
a first plurality of light emitting elements arranged at least in one direction, each of said light emitting elements being connected in parallel between first and second power supply potentials;
a corresponding first plurality of individual driving current control means each connected in series to a corresponding one of said first plurality of light emitting elements for controlling individually a driving current flowing through each of said first plurality of light emitting elements, respectively;
total driving current control means coupled to said first plurality of light emitting elements for controlling the total driving current flowing through said first plurality of light emitting elements,
a parallel connection of a plurality of resistance elements each connected to receive the first power supply potential; and
a corresponding plurality of switching means each connected to one of said plurality of resistance elements being selectively actuable to place a selected one of said plurality of resistances in series between said first power supply potential and said first plurality of light emitting elements.

* * * * *